United States Patent
Lee

(10) Patent No.: US 8,975,840 B2
(45) Date of Patent: Mar. 10, 2015

(54) APPARATUS FOR CONTROLLING INTERIOR PERMANENT MAGNET SYNCHRONOUS MOTOR

(71) Applicant: LSIS Co., Ltd., Anyang-si, Gyeonggi-do (KR)

(72) Inventor: Kyung Joo Lee, Seoul (KR)

(73) Assignee: LSIS Co., Ltd., Anyang-Si, Gyeonggi-do (KR)

( * ) Notice: Subject to any disclaimer, the term of this patent is extended or adjusted under 35 U.S.C. 154(b) by 175 days.

(21) Appl. No.: 13/727,344

(22) Filed: Dec. 26, 2012

(65) Prior Publication Data

US 2013/0169203 A1 Jul. 4, 2013

(30) Foreign Application Priority Data

Dec. 30, 2011 (KR) .................. 10-2011-0146780

(51) Int. Cl.
*H02P 21/14* (2006.01)
*H02P 21/00* (2006.01)

(52) U.S. Cl.
CPC .............. *H02P 21/14* (2013.01); *H02P 21/00* (2013.01)
USPC .................. 318/400.02; 318/400.01; 318/700

(58) Field of Classification Search
CPC ....................................... H02P 21/14
USPC .................. 318/400.02, 400.01, 700
See application file for complete search history.

(56) References Cited

U.S. PATENT DOCUMENTS

| 6,198,256 B1* | 3/2001 | Miyazaki et al. ............... 322/16 |
| 8,233,295 B2* | 7/2012 | Ransom et al. ................ 363/41 |
| 8,253,360 B2* | 8/2012 | Schulz et al. ............ 318/400.02 |

FOREIGN PATENT DOCUMENTS

| CN | 1838518 | 9/2006 |
| CN | 101425777 | 5/2009 |
| CN | 101958686 | 1/2011 |
| EP | 1521358 | 4/2005 |
| JP | 2000236694 | 8/2000 |
| JP | 2000262089 | 9/2000 |
| JP | 2003037988 | 2/2003 |
| JP | 2009171781 | 7/2009 |
| KR | 1999-0015680 | 3/1999 |
| KR | 20110081480 | 7/2011 |

OTHER PUBLICATIONS

Korean Intellectual Property Office Application Serial No. 10-2011-0146780, Office Action dated Apr. 19, 2013, 5 pages.

(Continued)

*Primary Examiner* — David S Luo
(74) *Attorney, Agent, or Firm* — Lee, Hong, Degerman, Kang & Waimey

(57) ABSTRACT

Disclosed is an apparatus for controlling an IPMSM, the apparatus according to exemplary embodiments of the present disclosure including a first generating unit generating a q-axis reference voltage of a synchronous reference frame from a reference frequency, a current converter generating a current of the synchronous reference frame from a 3-phase current of the IPMSM, and a voltage controller generating a d-axis reference voltage compensating a voltage in response to a load change.

6 Claims, 5 Drawing Sheets

(56) References Cited

OTHER PUBLICATIONS

Japan Patent Office Application Serial No. 2012-287800, Office Action dated Jan. 28, 2014, 2 pages.

The State Intellectual Property Office of the People's Republic of China Application Serial No. 201210592101.3, Office Action dated Sep. 30, 2014, 8 pages.

* cited by examiner

APPARATUS FOR CONTROLLING INTERIOR PERMANENT MAGNET SYNCHRONOUS MOTOR

CROSS-REFERENCE TO RELATED APPLICATIONS

Pursuant to 35 U.S.C. §119 (a), this application claims the benefit of earlier filing date and right of priority to Korean Patent Application No. 10-2011-0146780, filed on Dec. 30, 2011, the contents of which are hereby incorporated by reference herein in their entirety.

BACKGROUND OF THE DISCLOSURE

1. Field of Endeavor

The present disclosure relates to an apparatus for controlling interior permanent magnet synchronous motor.

2. Discussion of the Related Art

This section provides background information related to the present disclosure which is not necessarily prior art.

An IPMSM (Interior Permanent Magnet Synchronous Motor), being of higher efficiency than that of an induction motor, has come to have a great limelight in terms of energy saving. However, the IPMSM is disadvantageous due to being complicated in control over the induction motor.

The IPMSM is generally controlled based on a vector control (field-oriented control). Generally, the vector control method for calculating an accurate rotation velocity of a motor is broadly used in industrial fields requiring high performance of the motor.

The vector control is classified into two methods, based on presence or absence of a position sensor, that is, a sensored vector control and a sensorless vector control.

In order to obtain a good performance of an IPMSM during vector control, motor constants (stator resistance, d-axis inductance, q-axis inductance and magnetic flux of a permanent magnet) must be essentially learned, and in order to perform a smooth start, there is a need to learn a position of a magnetic pole in a permanent magnet. Because of these requirements, the control of an IPMSM suffers from decreased versatility or generality.

FIG. 1 is a block diagram illustrating a configuration of a PWM (Pulse Width Modulation) inverter system according to prior art.

Referring to FIG. 1, the inverter system according to prior art includes a 3-phase power source unit (100) for supplying a power source to a PWM inverter (200), a PWM inverter unit (200) for converting the power source received from the 3-phase power source unit (100), and an IPMSM (300) for being operated by a voltage generated by the PWM inverter unit (200).

The PWM inverter unit (200) in turn includes a power source converting unit (210) supplying a voltage to the IPMSM (300), a current detection unit (220) detecting a current flowing in the IPMSM (300), and a controller (230) controlling a voltage and a frequency supplied to the IPMSM (300).

FIG. 2 is a conceptual block diagram illustrating a detailed configuration of a controller in FIG. 1. The controller includes a V/F pattern unit (231) generating a reference voltage (Vref) from a reference frequency (fref), and a 3-phase reference voltage conversion unit (231) generating 3-phase reference voltages (Vasref, Vbsref, Vcsref) from the reference voltage (Vref) generated by the V/F pattern unit (231).

FIG. 3 is a current waveform of an IPMSM (300) during voltage/frequency constant control by the controller of FIG. 1.

Generally, an IPMSM is conventionally controlled by a vector control method. However, in order to implement the conventional vector control method, motor constants must be basically learned and complicated equations are required.

Per contra, in a case a voltage/frequency constant control method is applied to an induction motor as illustrated in FIG. 2, an operation can be simply implemented using a simple equation even if motor constants are not known.

In a case a voltage/frequency constant control method generally applied to an induction motor is applied to an IPMSM, start of the IPMSM under no-load state is enabled by saliency of the IPMSM (A section of FIG. 3).

However, in a case a load increases under a constant state of motor velocity (output frequency), magnitude of voltage, a power semiconductor device used for PWM inverter and a current stress of the IPMSM increase due to fixation of magnitude of voltage and a current of the IPMSM being greatly shaken to increase the magnitude as in B section of FIG. 3.

As a result, operation of IPMSM suffers from a disadvantage under the simple voltage/frequency constant control method.

SUMMARY OF THE DISCLOSURE

This section provides a general summary of the disclosure, and is not a comprehensive disclosure of its full scope or all of its features.

Methods and systems consistent with the present disclosure provide an apparatus for controlling an IPMSM configured to easily control an IPMSM without using a complicated vector control by implementing a voltage control based on load change in a voltage/frequency control of the IPMSM using a PWM inverter.

It should be emphasized, however, that the present disclosure is not limited to a particular disclosure as explained above. It should be understood that other technical subjects not mentioned herein may be appreciated by those skilled in the art.

In one general aspect of the present disclosure, there is provided an apparatus for controlling an IPMSM, the apparatus comprising: a first generating unit configured to generate a q-axis reference voltage of a synchronous reference frame from a reference frequency; a current converter configured to generate a current of the synchronous reference frame from a 3-phase current of the IPMSM; and a voltage controller configured to generate a d-axis reference voltage compensating a voltage in response to a load change.

In some exemplary embodiments, the apparatus may further comprise a first converting unit configured to convert the q-axis reference voltage and the d-axis reference voltage to a 3-phase reference voltage, and provide the converted 3-phase reference voltage to the IPMSM.

In some exemplary embodiments, the apparatus may further comprise a current detection unit configured to detect a 3-phase current inputted into the IPMSM, wherein the current detection unit provides a detected 3-phase current to the current converter.

In some exemplary embodiments, the current converter may comprise a second conversion unit configured to convert the 3-phase current to a 2-phase current of a stationary reference frame, and a third conversion unit configured to convert the 2-phase current of a stationary reference frame to a 2-phase current of a synchronous reference frame.

In some exemplary embodiments, the current converter may further comprise an A/D (Analogue/Digital) converter configured to convert the 3-phase current of the IPMSM to a digital data.

In some exemplary embodiments, the voltage controller may generate the d-axis reference voltage by observing a torque component current from the current of the synchronous reference frame obtained by the current conversion unit.

In some exemplary embodiments, the voltage controller may comprise a comparator configured to generate an error between a present current and a pre-present current from the current of the synchronous reference frame received from the current converter; and a second generating unit configured to generate the d-axis reference voltage by applying a proportional gain to the error.

The apparatus for controlling an IPMSM according to the present disclosure has an advantageous effect in that a control of an IPMSM can be easily performed by implementing a torque pulsation alleviating voltage control based on voltage/frequency constant control generally used for an induction motor, dispensing with a vector control requiring a complicated equations and motor constants during control of the IPMSM using a PWM inverter.

BRIEF DESCRIPTION OF THE DRAWINGS

The above and/or other aspects of the present disclosure will become apparent and more readily appreciated from the following description of the exemplary embodiments, taken in conjunction with the accompanying drawings of which.

DETAILED DESCRIPTION OF PREFERRED EMBODIMENTS

In describing the present disclosure, detailed descriptions of constructions or processes known in the art may be omitted to avoid obscuring appreciation of the invention by a person of ordinary skill in the art with unnecessary detail regarding such known constructions and functions. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Various exemplary embodiments will be described more fully hereinafter with reference to the accompanying drawings, in which some exemplary embodiments are shown. The present inventive concept may, however, be embodied in many different forms and should not be construed as limited to the example embodiments set forth herein. Rather, these exemplary embodiments are provided so that this description will be thorough and complete, and will fully convey the scope of the present inventive concept to those skilled in the art.

A load applied in a motor may be divided into a CT (Constant Torque) load and a VT (Variable Torque) load. Although a torque performance must be obtained in all velocity area under the CT load, there is no need, in the VT load, of obtaining a torque performance in all velocity area due to, in most parts, a torque increasing in proportion to velocity. Representative VT loads may include a fan and a pump load.

In a case an IPMSM is applied to the VT load, a high performance control is not required like a vector control. Thus, the present disclosure can obtain a motor performance, even if a complicated algorithm like a vector control is not applied, by introducing a voltage/frequency constant control which is an easy control method for induction motor.

Now, exemplary embodiments of the present disclosure will be described in detail with reference to the accompanying drawings.

Figure 4:
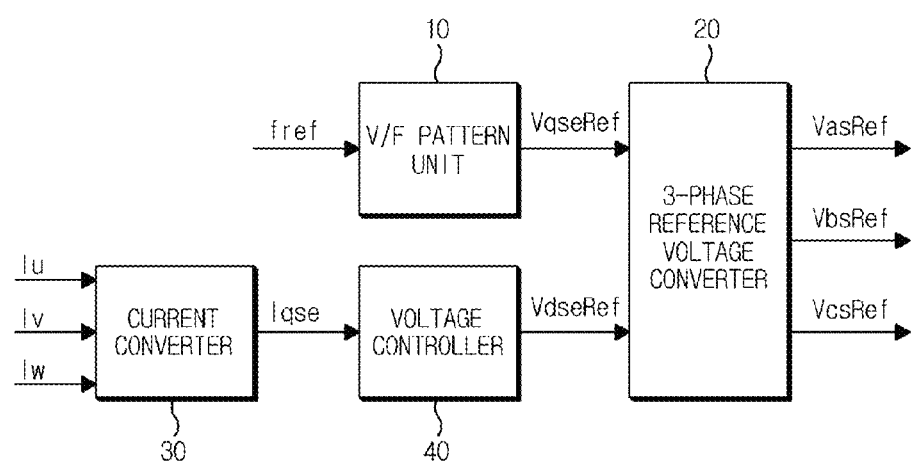
FIG. 4 is a block diagram illustrating a configuration of an apparatus for controlling an IPMSM according to an exemplary embodiment of the present disclosure.

FIG. 4 is a block diagram illustrating a configuration of an apparatus for controlling an IPMSM according to an exemplary embodiment of the present disclosure.

Figure 1:
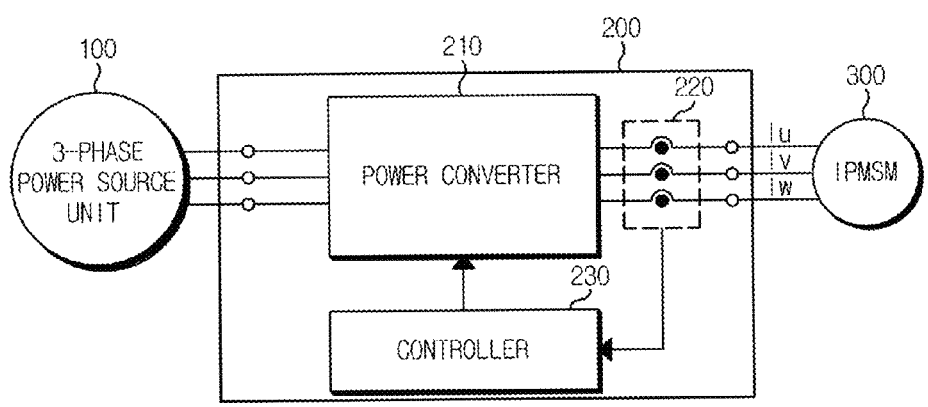
FIG. 1 is a block diagram illustrating a configuration of a PWM (Pulse Width Modulation) inverter system according to prior art.
Figure 2:
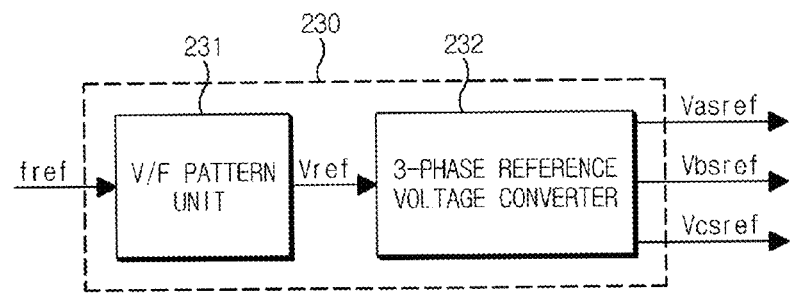
FIG. 2 is a conceptual block diagram illustrating a detailed configuration of a controller in FIG. 1.

The apparatus for controlling an IPMSM according to an exemplary embodiment of the present disclosure is provided to an interior of a PWM inverter (200) of an inverter system as shown in FIG. 1, and is provided to perform a voltage/frequency constant control of an IPMSM (300), replacing a controller (230), for example.

Referring to FIG. 4, an apparatus for controlling an IPMSM (hereinafter referred to as 'apparatus') comprises a V/F (Voltage/Frequency) pattern unit (10), a 3-phase reference voltage generating unit (20), a current conversion unit (30) controlling a motor current by measuring the motor current and a voltage controller (40) compensating a voltage in response to a load change.

The V/F pattern unit (10) generates a q-axis reference voltage (VqseRef) of a synchronous reference frame from a reference frequency (fref). Configuration and operation of the V/F pattern unit (10) are well known to the skilled in the art, such that no detailed explanation thereto will be omitted.

In order for the current conversion unit (30) and the voltage controller (40) to restrict a torque component-current pulsation in response to load change in the IPMSM (300) in the present disclosure, a d-axis reference voltage (VdseRef) is generated to control both the voltage magnitude of the V/F pattern unit (10) and the d-axis voltage, whereby phase can be controlled. Detailed configuration of the current conversion unit (30) and the voltage controller (40) will be described later.

The 3-phase reference voltage conversion unit (20) converts the reference voltages (VdseRef, VqseRef) to 3-phase reference voltages (VasRef, VbsRef, VcsRef), and supplies the conversions to a power conversion unit (210) of a PWM inverter (200) and to the IPMSM (300).

The d-axis reference voltage (VdeRef) for restricting the torque component-current pulsation in response to load change in the motor is generated by observing an Iqse current corresponding to a torque component current obtained from a current detection unit (220) using 3-phase currents (Iu, Iv, Iw) of the motor.

Figure 5:
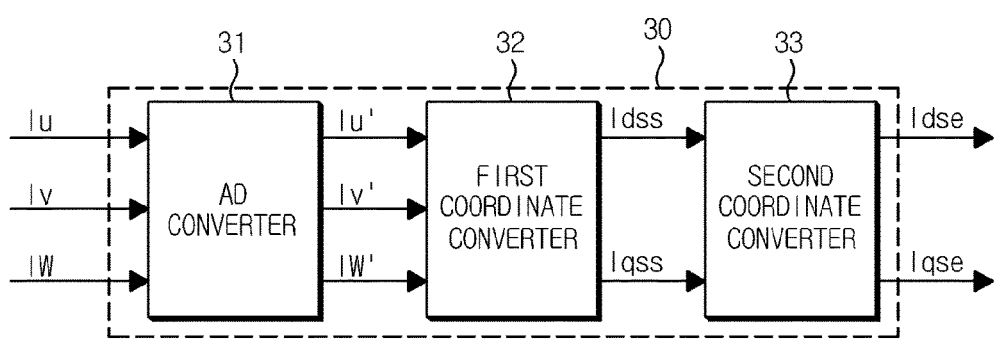
FIG. 5 is a schematic block diagram illustrating a current conversion unit of FIG. 4 according to an exemplary embodiment of the present disclosure.

FIG. 5 is a schematic block diagram illustrating a current conversion unit of FIG. 4 according to an exemplary embodiment of the present disclosure;

Referring to FIG. 5, the current conversion unit (30) according to the present disclosure comprises an A/D (Analog/Digital) converter (31) converting the 3-phase currents (Iu, Iv, Iw) to digital data, a first coordinate converter (32) converting the digitalized datas (Iu', Iv', Iw') to 2-phase AC currents of a stationary reference frame, and a second coordinate converter (33) converting the 2-phase AC currents (Idss, Iqss) to 2-phase DC currents of a synchronous reference frame.

The current detection unit (220) of FIG. 1 detects the motor currents (Iu, Iv, Iw) and transmits the motor currents (Iu, Iv, Iw) to the apparatus of the present disclosure.

The first coordinate converter (32) obtains the 2-phase currents (Idss, Iqss) of the stationary reference frame from the following Equation 1, using the currents (Iu', Iv', Iw') digitally-converted by the A/D converter (31):

$$Idss = Iu'$$
$$Iqss = \frac{1}{\sqrt{3}} \times (Iv' - Iw')$$ [Equation 1]

The second coordinate converter (33) converts the currents (Idss, Iqss) of the stationary reference frame obtained by the first coordinate converter (32) to 2-phase DC currents (Idse, Iqse) of the synchronous reference frame, using the following Equation 2:

$$Idse = Idss \times \cos\theta + Iqss \times \sin\theta$$

$$Iqse = -Idss \times \sin\theta + Iqss \times \sin\theta$$ [Equation 2]

The d-axis reference voltage (VdeRef) is generated by the voltage controller (40) by observing the torque component current (Iqse) obtained by the current converter (30), which is explained with reference to a drawing.

Figure 6:
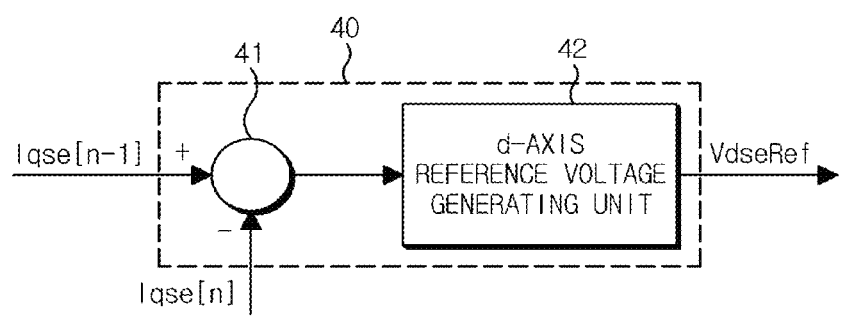
FIG. 6 is a schematic block diagram illustrating a voltage controller of FIG. 4 according to an exemplary embodiment of the present disclosure.

FIG. 6 is a schematic block diagram illustrating a voltage controller of FIG. 4 according to an exemplary embodiment of the present disclosure, where the voltage controller (40) finally generates a voltage (VdseRef) for restricting the pulsation of a current (Iqse) corresponding to the torque component current.

Referring to FIG. 6, the voltage controller (40) of the present disclosure comprises a comparator (41) generating an error between a pre-present current (Iqse[n−1]) and a present current (Iqse[n]), and a d-axis reference voltage generating unit (42).

The comparator (41) generates an error between the pre-present current (Iqse[n−1]) and the present current (Iqse[n]), as explained above.

The d-axis reference voltage generating unit (42) multiplies the error between the pre-present current (Iqse[n−1]), which is an output of the comparator (41), and the present current (Iqse[n]) by a proportional gain (K) to generate a d-axis reference voltage.

The voltage controller (40) of the present disclosure decreases a d-axis reference voltage in a case the present current (Iqse[n]) is greater than the pre-present current (Iqse[n−1]), and increases the d-axis reference voltage in a reverse case, to constantly control the torque component current (Iqse), whereby a torque ripple caused by load change in the IPMSM (300) can be reduced.

The d-axis reference voltage (VdseRef) may be obtained by the following Equation 3:

$$VdseRef = K \times (Iqse[n-1] - Iqse[n])$$ [Equation 3]

Figure 7:
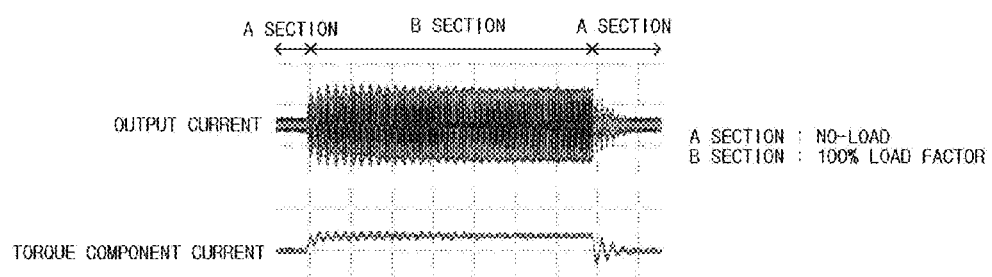
FIG. 7 is a schematic view illustrating a current in response to a load of an IPMSM in an inverter system applied with an apparatus for controlling an IPMSM according to an exemplary embodiment of the present disclosure.

FIG. 7 is a schematic view illustrating a current in response to a load of an IPMSM in an inverter system applied with an apparatus for controlling an IPMSM according to an exemplary embodiment of the present disclosure.

Figure 3:
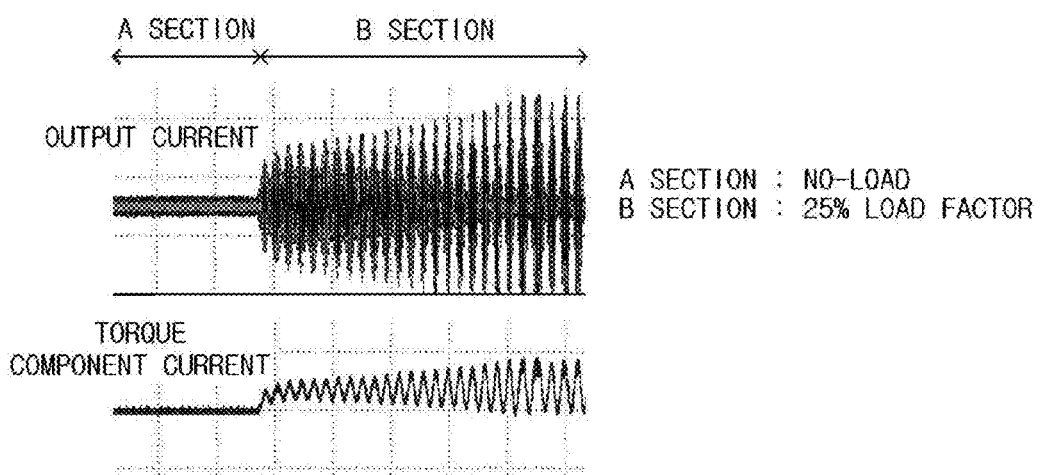
FIG. 3 is a current waveform of an IPMSM (300) during voltage/frequency constant control by the controller of FIG. 1.

Referring to FIG. 7, it can be noted that the IPMSM according to the present disclosure can reduce a current pulsation in response to a load as in FIG. 3 and can be operated in a normal state.

Although the present disclosure has been described with reference to a number of illustrative embodiments thereof, it should be understood that numerous other modifications and embodiments can be devised by those skilled in the art that will fall within the spirit and scope of the principles of this disclosure.

More particularly, various variations and modifications are possible in the component parts and/or arrangements of subject combination arrangement within the scope of the disclosure, the drawings and the appended claims. In addition to variations and modifications in the component parts and/or arrangements, alternative uses will also be apparent to those skilled in the art.

What is claimed is:

1. An apparatus for controlling an Interior Permanent Magnet Synchronous Motor (IPMSM), the apparatus comprising:
 a first generating unit configured to generate a q-axis reference voltage of a synchronous reference frame from a reference frequency;
 a current converter configured to generate a current of the synchronous reference frame from a 3-phase current of the IPMSM; and
 a voltage controller configured to generate a d-axis reference voltage for compensating a voltage in response to a load change, wherein the voltage controller comprises:
 a comparator configured to generate an error between a present current and a previous current based on the generated current; and
 a second generating unit configured to generate the d-axis reference voltage by applying a proportional gain to the generated error.

2. The apparatus of claim 1, further comprising a first converting unit configured to:
 convert the q-axis reference voltage and the d-axis reference voltage to a 3-phase reference voltage; and
 provide the converted 3-phase reference voltage to the IPMSM.

3. The apparatus of claim 1, further comprising a current detection unit configured to:
 detect a 3-phase current input to the IPMSM; and
 provide the detected 3-phase current to the current converter.

4. The apparatus of claim 1, wherein the current converter comprises:
 a first conversion unit configured to convert the 3-phase current to a 2-phase current of a stationary reference frame; and
 a second conversion unit configured to convert the 2-phase current of the stationary reference frame to a 2-phase current of the synchronous reference frame.

5. The apparatus of claim 4, wherein the current converter further comprises:
 an A/D (Analog/Digital) converter configured to convert the 3-phase current to digital data.

6. The apparatus of claim 1, wherein the voltage controller is further configured to generate the d-axis reference voltage by observing a torque component current from the generated current.

* * * * *